United States Patent
Wang et al.

(10) Patent No.: US 6,168,735 B1
(45) Date of Patent: Jan. 2, 2001

(54) METHOD OF MAKING A FOAM CORE ARTICLE

(75) Inventors: Jenny Wang; Kevin Ray Hauser, both of Ann Arbor, MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/074,190

(22) Filed: May 7, 1998

(51) Int. Cl.$^7$ .................................................. B29C 67/20
(52) U.S. Cl. ...................... 264/46.6; 264/257; 264/263; 264/331.15
(58) Field of Search ................... 264/257, 271.1, 264/273, 274, 272.13, 331.15, 46.4, 46.6, 263

(56) References Cited

U.S. PATENT DOCUMENTS

| | | | |
|---|---|---|---|
| 2,682,111 | * 6/1954 | Kish ........................................ 33/174 |
| 2,836,530 | * 5/1958 | Rees ...................................... 154/110 |
| 3,088,174 | * 5/1963 | Kolt ......................................... 18/59 |
| 3,953,393 | * 4/1976 | Ramlow et al. ................. 260/31.8 R |
| 3,965,057 | 6/1976 | Ammons et al. . |
| 4,168,342 | 9/1979 | Wang . |
| 4,198,488 | * 4/1980 | Drake et al. .......................... 521/137 |
| 4,239,571 | * 12/1980 | Cobb ................................. 156/307.1 |
| 4,264,643 | 4/1981 | Granata et al. . |
| 4,543,289 | 9/1985 | Park . |
| 4,560,523 | * 12/1985 | Plumley et al. ...................... 264/250 |
| 4,742,323 | * 5/1988 | Hettinga ............................... 156/245 |
| 5,096,243 | * 3/1992 | Gembinski ........................... 293/120 |
| 5,132,069 | * 7/1992 | Newton ................................ 264/257 |
| 5,236,321 | * 8/1993 | Newton ................................ 264/258 |
| 5,260,343 | * 11/1993 | Harrison et al. ....................... 521/51 |
| 5,304,339 | * 4/1994 | Le Comte ............................ 264/511 |
| 5,344,601 | * 9/1994 | Newton ................................ 264/255 |
| 5,344,852 | 9/1994 | Brooks et al. . |
| 5,401,449 | * 3/1995 | Hill et al. ............................. 156/245 |
| 5,580,502 | * 12/1996 | Forster et al. ....................... 264/257 |
| 5,604,266 | 2/1997 | Mushovic . |
| 5,681,519 | * 10/1997 | Kelman ............................... 264/257 |
| 5,686,187 | * 11/1997 | Turnbach ............................ 264/257 |
| 5,798,165 | * 8/1998 | Mizoguchi et al. ................. 264/257 |

OTHER PUBLICATIONS

Product Data, MHOROMER® BM–903, Aug. 9, 1994.
Product Data, MHOROMER® D–1108, May 13, 1996.
Product Information, (MHOROMER D–1132), Apr. 3, 1998.
Material Safety Data Sheet, Product: BETAFOAM99** 87100 Isocynate, Apr. 29, 1997.
Material Safety Data Sheet, Product: BETAFOAM99** 87156 Polyol, Jul. 23, 1997.

* cited by examiner

Primary Examiner—Jan H. Silbaugh
Assistant Examiner—Stefan Staicovici
(74) Attorney, Agent, or Firm—Damian Porcari

(57) ABSTRACT

A method of manufacturing a fiber-reinforced article by providing a foam core made from a polyol containing at least one unsaturated C═C group and a hydroxyl functional group. A fiber-reinforcing layer is placed adjacent the foam core. An uncured liquid resin wets the fiber reinforcing layer and the outer surface of the foam core. The resin reacts with the unsaturated C═C group of the polyol by a free radical reaction. The resin also cross-links and forms a solid polymer encasing the fiber-reinforcing layer. The resin bonds the fiber-reinforcing layer directly to the foam core. The fiber reinforcing layer, foam core and resin form a composite laminate structure that is stronger and more resistant to delamination because the resin is chemically bonded to the foam core.

13 Claims, No Drawings

METHOD OF MAKING A FOAM CORE ARTICLE

BACKGROUND OF THE INVENTION

1. Field of the Invention

The present invention is directed to a plastic article consisting of a foam core and a fiberglass reinforced polymer layer surrounding the foam core. More specifically, the invention relates to an improved foam formulation that promotes chemical bonding between the resin and the foam core.

2. Description of the Related Arts

Fiber reinforced plastic (FRP) articles are well known. One example of a material using FRP technology is a sandwich structure, which consists of one or more fiber layers surrounding a core. Using a process called resin transfer molding (RTM), a polymeric resin impregnates the fibers and is cured or cooled to form the article. Foam is particularly suitable for FRP cores because it is lightweight, low-cost, and generally easily manufactured into the desired shape. Polyurethane foam has been widely used in the manufacture of core materials for FRP articles because it exhibits the best balance of these desired properties.

When the FRP application requires increased rigidity, such as for structural applications or applications where delamination is unacceptable, the surface of the foam core may be abraded or scored to provide sights for mechanical attachment between the foam and resin. In this case, the resin enters the surface irregularities or pores of the foam and cures or solidifies. For laminating resins and foam systems that are incompatible, the resin generally does not chemically bond to the foam, but rather forms a mechanical attachment only in the area of the surface irregularity. The mechanism for this mechanical interlock involves the micro-impregnation of uncured polymeric resin into irregularities/pores on the foam surface. This type of mechanical interlock results in a stiff structure which, when stressed to failure, results in cohesive failure (failure in the foam). RTM articles that do not use either a mechanical or chemical surface abrasion of the foam core are more subject to adhesive failure (failure at the bond line). Adhesive failure results from stressing structures containing a discrete boundary layer between that foam and resin, where the foam and resin are unbonded. Experiments performed to assess adhesion for RTM articles found that there is a greater than 200% improvement in the adhesion strength for the mechanically abraded foam core, as compared to a non-abraded foam core.

There are several disadvantages with this mechanical attachment including the complexity of providing these surface irregularities on the foam for attachment by the resin. When a high viscosity resin is used, its ability to penetrate into the surface irregularities to form a mechanical attachment to the foam is reduced. Another disadvantage of this system is that the mechanical attachment only exists on the areas of the foam that contain the surface irregularity. Therefore, the foam surface abrasion operation becomes particularly critical inasmuch as the adhesion will only be adequate in areas where the abrasion operation is adequate. In addition, excess abrasion may weaken the foam core and, consequently, the RTM article and it is difficult to reduce part variability because the mechanical abrading process (sanding) is not easily repeatable.

These mechanical attachments between the foam and resin are needed because the foam and resin normally used in FRP articles do not chemically bond to one another. For example, urethane foam cores made from saturated polyol and isocyanate form a saturated polyurethane foam having these species in a cross-linking network. Typical saturated foam cores include urethanes, ureas, allophanates, biurets, isocyanurates, uretidinedione, carbodiimide and other rigid or semi-rigid species. The hydrocarbon functional groups in these foams result from both the original saturated polyol and isocyanate precursors. Therefore, the foams currently used in RTM have no double bonds that are capable of bonding with the resin.

Resins normally used with FRP articles include unsaturated polyester or vinyl ester compounds that use a free-radical reaction mechanism to join the various polymer chains and cross-link. The unsaturated resin contains C=C double bonds that provide locations for the resin to cross-link and cure.

None of the species or bonds existing in saturated polyurethane foam can form chemical bonds with the species present in the vinyl ester resin system. Although there is physical interaction between these two polar materials, it is not strong enough to provide good adhesion. Therefore, the vinyl ester thermosetting resins typically do not adhere to the saturated polyurethane foam in an RTM process.

One way of making the resin and foam bond to one another was to make the resin and foam from the same material using a process as described in U.S. Pat. No. 4,543,289. Both the foam and resin are made from vinyl chloride copolymer. A core material that expands when heated is placed between thermoplastic polymer sheets and reinforcing layers. The sandwich is placed within a mold and heated. The heat causes the core to foam and fuse to the thermoplastic polymer sheets. Because the core and foam are made from the same resin, the article does not suffer from the compatibility problem described above. While this solution eliminates the incompatibility problem, it restricts the materials available to make FRP articles to thermoplastic resins and foams. However, thermoplastic materials do not provide the thermal properties required for many applications. Also, due to their high viscosity, thermoplastics cannot attain the same fiber reinforcement levels as thermosets and are, therefore, substantially weaker.

Another method of increasing the adhesion between vinyl resin and polyurethane is to apply an aqueous acetic acid solution to the vinyl resin. U.S. Pat. No. 4,264,643, teaches a method of making a laminated floor having a polyurethane top layer and a vinyl resinous inner layer. The vinyl resin inner layer is activated with acetic acid solution. A polyurethane layer is applied to the activated vinyl resinous layer and cured using UV light. The polyurethane layer was found to bond to the vinyl resin inner layer. The method thus described was not used to bond a liquid resin to a polyurethane foam nor can the method be used in resin transfer molding because it requires that the vinyl resin layer be cured prior to application of the acetic acid solution. It is desirable to provide a method that enables a liquid uncured vinyl ester material to be bonded to a polyurethane foam core.

By recognizing the failure mechanism between traditional foam cores and resins, the present invention enables the selection of compatible materials that adhere and produce stronger composite sandwich structures. These deficiencies and problems are overcome by the present invention.

SUMMARY OF THE INVENTION

It is an object of the present invention to provide a method of manufacturing a fiber-reinforced article wherein-the laminating layer is bonded to the foam core without the need of a mechanical attachment that resulted from either a chemical or mechanical abrasion of the foam surface and without the use of a chemical compatiblizer intermediate layer. The method is practiced by using a foam material having an unsaturated polyol that is available to react with the uncured resin. The method comprises a series of steps including providing a foam core made from a polyol containing at least one unsaturated C=C group and a hydroxyl functional group. A fiber-reinforcing layer is placed adjacent the foam core. An uncured liquid resin wets the fiber reinforcing layer and the outer surface of the foam core. The resin reacts with t ,he unsaturated C=C group of polyol by a free radical reaction. The resin also cross-links and cures and forms a solid polymer encasing the fiber reinforcing layer that also bonds the fiber-reinforcing layer to the foam core. The fiber reinforcing layer, foam core and resin form a composite sandwich structure that is stronger and more resistant to delamination because the resin is chemically bonded to the foam core.

The invention may utilize a variety of unsaturated polyol materials, but the methacrylate type polyols such as 2-hydroxyethyl methacrylate, glycerol 1,3 dimethacrylate and glycerolmonomethacrylate were found to be suitable for the present invention.

These and other objects, features, and advantages of the present invention will become more readily apparent when viewed in connection with the detailed description and examples.

DETAILED DESCRIPTION OF THE PREFERRED EMBODIMENTS

Manufacture of the Polyurethane Foam

Most rigid polyurethane foams are produced by reacting an isocyanurate and a polyol. In most cases, instead of a single polyol, a mixture of different types of polyol (for example polyether type and polyester type) or the same type polyol with different molecular weight and functionality was used. The purpose of doing this was to obtain balanced polyol reactivity and desired properties of the final product. The reaction between isocyanate and polyol is described below:

R—OH+R'—NCO→R—O—CO—NH—R'
R'—NCO+H$_2$O→R'—NH$_2$+CO$_2$↑
R'—NH$_2$+R'—NCO→R'—NH—CO—NH—R'
3(OCN—R'—NCO)→Isocyanurate These reactions result in a mixture of chemical species, including:

Urethanes:
R—NH—COO—R

Ureas:
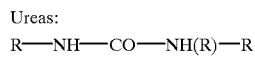

-continued

Allophanates:
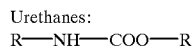

Biurets:
R—N—CO—NH—R
  |
  CO—NH—R

Isocyanurates: (Trimerization)
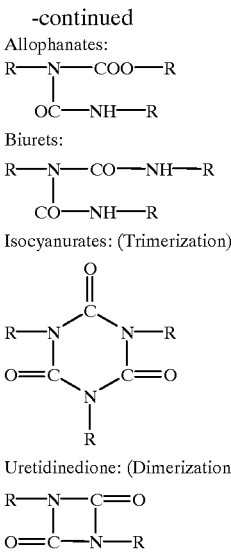

Uretidinedione: (Dimerization)
R—N—C=O
  |   |
O=C—N—R

Carbodiimide: (Condensation of isocyanates under the influence of heat and(or) specific catalysts such as substituted phospholene oxides):

R—N=C=N—R

The group R in the above compositions is a saturated hydrocarbon (a C=C having only a single bond). The relative amount of these species depends on the stoichiometries, choices of isocyanate and polyols, presence of water, catalyst and other additives. Each of the species found in the polyurethane foam contributes to the processability and physical properties of the final products.

Since high functional polyol($\geq$2 for —OH) and isocyanate (polymeric methylene polyphenyl isocyanate MDI) are used in the polyurethane foam formation, the principal structure of polyurethane foam materials is a cross-linked structure containing the above listed species as part of the network.

Laminating Resin Materials

One resin composition tested included thermosetting vinyl ester resin having the following structure:

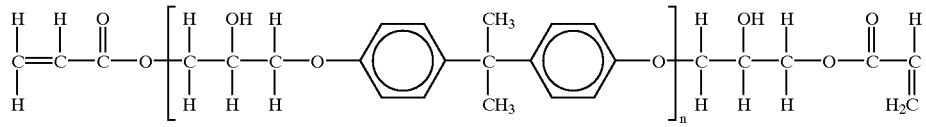

With peroxide initiator, primary and secondary promoters, and styrene monomers, the final three-dimensional cross-linking structure is formed through free-radical polymerization of vinyl groups (C=C groups containing a double bond), in the above structure, and the styrene monomers.

As described, the vinyl ester resins cure through free radical polymerization. Only the double C=C bond is reactive in free radical.curing. Traditional polyurethane foam from saturated polyol contains no double bonds, and therefore does not present a C=C double bond for free radical polymerization with the vinyl ester resin. The invention utilizes supplying a polyol that contains an unsaturated C=C double bond and a hydroxyl group to provide a site on the foam for free radical polymerization between the resin and foam. The hydroxyl group in the unsaturated polyol will participate in the polyurethane foam crosslinking, whereas the C=C double bond participates in the free radical laminating resin cure. The unsaturated polyol serves as a link between the cured foam and the cured laminating resin.

Polyol Additive

One class of foam additive polyol that is useful with the present invention is the methacrylate type of polyol. The desired functional groups (C=C bonds) are contained in this class of chemical. It contains at least one C=C double bond and hydroxyl group. Other additives with one or more C=C double bonds and at least one hydroxyl group should be useful. The following unsaturated methacrylates are useful in the present invention:

A. 2-hydroxyethyl methacrylate manufactured by Rohm under the tradename MHOROMER™ BM-903:

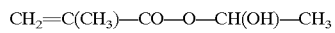

The polyol should also contain at least one hydroxyl functional group. The hydroxyl functional group will react with isocyanate when preparing polyurethane foam. The invention will be described by blending a commercially available saturated polyol with an unsaturated polyol additive that will react with the isocyanate, but leave intact the C=C double bonds for the later free radical reaction with the laminating resin. It may also be possible to formulate the base polyol with the desired C=C double bond and eliminate the need for an additive altogether.

The equivalent weight of the entire polyol package (both saturated and unsaturated) should be calculated according to the polyurethane formulation calculation. Given the concentration of the unsaturated polyol, the equivalent weight of the entire polyol package may be calculated by using equation (1).

$$Eq.W_t(S+US) = \frac{W_t(S) + a\% \times W_t(S)}{\frac{W_t(S)}{[M_W(S)/f_{OH}(S)]} + \frac{a\% \times W_t(S)}{[M_W(US)/f_{OH}(US)]}} \quad \text{Equation (1)}$$

Where:

| | |
|---|---|
| $Eq.Wt(S+US)$ | Equivalent weight of the entire polyol package (both saturated ($S$) and unsaturated ($US$)) |
| $W_t(S)$ | Weight of saturated polyol |
| $a\%$ | Concentration of unsaturated polyol by weight of saturated polyol |
| $a\% \times W_t(S)$ | Weight of unsaturated polyol |
| $M_W(S)$ | Molecular weight of saturated polyol |
| $M_W(US)$ | Molecular weight of unsaturated polyol |
| $f_{OH}(S)$ | Hydroxyl functionality of saturated polyol |
| $f_{OH}(US)$ | Hydroxyl functionality of unsaturated polyol |

B. glycerol 1,3 dimethacrylate manufactured by Rohm under the tradename MHOROMER™ D-1108:

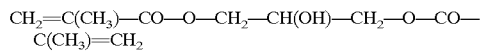

and

C. glycerolmonomethacrylate manufactured by Rohm under the tradename MHOROMER™ D-1132:

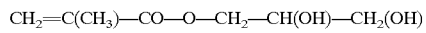

For any vinyl ester resin, an unsaturated polyol with at least one relatively reactive double bond can be useful in this invention. The reactivity of the double bond enables the resin to cross-link and bond to the polyol. Polyols with a C=C double bond that have low reactivity do not polymerize sufficiently with the vinyl ester resin to provide a good bond between the foam and resin. Examples of polyols with low reactivity are 5-hexene-1,2-diol and 2-butene-1,4-diol. Due to the low reactivity of their double bonds, the results obtained from the use of these polyols were unsatisfactory. Polyols with higher C=C double bond reactivity, such as methacrylate type polyols, are preferred.

The calculation result will be used to adjust the ratio and/or Index of polyurethane foam basic formulation. The water level may be adjusted when necessary to ensure proper blowing and the balance between blowing and gelling.

To determine the proper amount of unsaturated polyol to add, it is first useful to determine a base line for the foam/resin system that uses saturated polyol. A sample of foam is prepared using 100% saturated polyol. Some samples of foam should have surface abrasion to provide a target benchmark for peel strength. The foam samples are then used to prepare test laminates. The peel strength of the test laminates is measured. These peel strengths are used as a guide to formulating new foam compositions that have higher peel strengths than the saturated polyol foams.

The inclusion of the unsaturated polyol may reduce the physical properties of the resulting foam. The inclusion of the unsaturated polyol to improve the bond between the resin and foam must be balanced with the weakened physical properties of the foam. For this reason, it is desirable that the polyol maintain the same equivalent weight before and after adding the additive. This can be done by selecting an unsaturated polyol with the same $[M_W/f_{OH}]$ value as the saturated polyol. However, this may not be a feasible approach because it might be difficult to find such an unsaturated polyol. Therefore, instead of maintaining the same equivalent weight, one can go higher or lower based on the results from lab trials with different additives and different formulations. Empirically, the equivalent weight of the entire polyol package within the range of ±30%×[Eq.Wt of saturated polyol] is considered most appropriate.

The number of hydroxyl groups in the unsaturated polyol is also called the hydroxyl functionality (fOH). One can select an unsaturated polyol with hydroxyl functionality between 1 to 3, which means that there are 1 to 3 hydroxyl groups in its molecular structure. The location of these hydroxyl groups indicates the hydroxyl reactivity. Normally, a primary hydroxyl group has the lowest reactivity and tertiary the highest. The unsaturated polyol with a secondary hydroxyl group was found satisfactory in this invention. When the concentration of the unsaturated polyol was higher than 15% by weight of original polyol, it is suggested to lower the index to provide the proper gel and cure times.

Two typical reactions with unsaturated polyol additive in polyurethane foam system are shown below:

(1) Polyol additive react with isocyanate

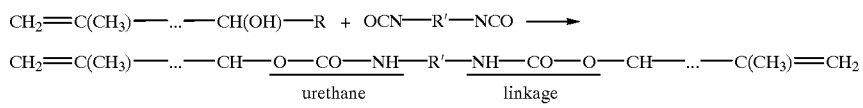

(2) Free radical reaction between vinyl ester and unsaturated polyol

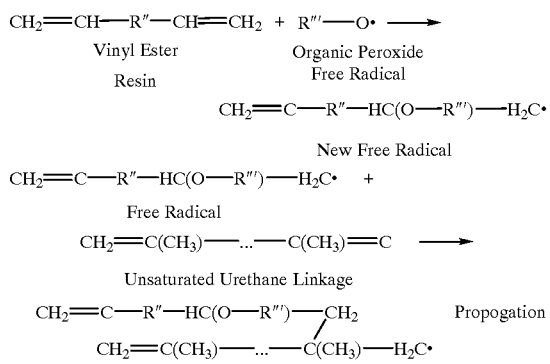

EXAMPLE 1

A representative example is given using a base polyol of polyether with the additive glycerol 1,3 dimethacrylate. This was the most preferred combination.

The base composition for reference was an isocyanurate modified polyurethane foam. The following table listed the necessary data the original foam system.

TABLE 2

| Ratio by weight (Isocyanate/polyol) | Polyol equivalent weight | Isocyanate equivalent weight | H₂O% by wt. of Polyol |
|---|---|---|---|
| Foam 2:1 | 173 | 134.2 | 1.3 |

The saturated polyol was a polyether manufactured by Essex Specialty Products, Inc., Auburn Hills Mich. under the tradename BETAFOAM 87156 POLYOL. The isocyanate was BETAFOAM 87100 ISOCYANATE, also by Essex Specialty Products. The base foam was prepared by thoroughly mixing the two, BETAFOAM 87156 POLYOL and BETAFOAM 87100 ISOCYANATE, according to the mixing ratio provided by the foam supplier. The mixture will start blowing and gelling and eventually cure. The time needed for the entire foaming process depends on the formulation. After the mixing step, the mixture is poured into the mold and cured. The foam is removed from the mold after curing. Optionally, the mold may be preheated to ensure adequate curing or to shorten curing time.

The base foam, when made into laminates with vinyl ester resin, had a peak peel stress of about 15 lbs. tested by using a three point bending peel strength testing. The base foam having its surface abraded with sandpaper and then made into laminates had a peak peel stress of about 35 lbs. by using the same testing methods.

The invention improved the peel strength of the laminate by including an additive of glycerol 1,3 dimethacrylate. An unsaturated polyol foam was prepared by the following method:

The formulation method assumes a variety of concentrations of unsaturated polyol by weight of saturated polyol (a%) to identify an equivalent weight of the entire polyol package (both saturated and unsaturated) (Eg. Wt (S+US)) that is approximately equal to the equivalent weight of the base polyol (Eg. Wt (S)). The following table gives the formulation result with additive Glycerol 1,3 dimethacrylate as compared to the traditional formulation.

TABLE 3

| | Unsaturated foam formulation | | | Base foam Formulation | |
|---|---|---|---|---|---|
| | Original polyol | Glycerol 1,3 dimethacrylate | Isocyanate | Original polyol | Isocyanate |
| 100 | 100 | 15 | 178.6 | 100 | 200 |
| Individual Eq.Wt (g) | 173 | 228 | 134.2 | 173 | 134.2 |
| Total Eq.Wt. (g) | | 179 | 134.2 | 173 | 134.2 |
| Water adjustment (g) | | 0.195 | | | 0 |
| Weight ratio (isocyanate/polyol) | | 1.55:1 [178.6/(100 + 15 + 0.195) = 1.55] | | | 2:1 |
| Index | | 200 | | | 250 |

Test Regimen

The foam is molded into a flat plaque with dimensions of 612 mm×612 mm×6 mm. This plaque is then sandwiched between two layers of fiberglass and placed into a hot mold cavity. The mold is closed and reacting vinyl ester resin is injected into the mold, impregnating the fiberglass layers. When the resin is cured, the mold is opened and the part removed. To evaluate the quality of adhesion between the fiberglass reinforced laminate and urethane foam core, specimens are cut from the part according to specific dimensions and the peak peel stress required to remove the laminate is measured.

EXAMPLE 2

Samples were prepared using the method described in Example 1 except for the following formulation table:

The following table gives the formulation result with Monomethacrylatediol type of additive Glycerolmonomethacrylate at 30% by weight of original saturated polyol as compared to the traditional formulation.

TABLE 4

|  | Unsaturated foam formulation | | | Base foam Formulation | |
| --- | --- | --- | --- | --- | --- |
|  | Original polyol | Glycerolmono-methacrylate | Iso-cyanate | Original polyol | Iso-cyanate |
| Weight (g) | 100 | 30 | 267.4 | 100 | 200 |
| Individual Eq.Wt (g) | 173 | 80 | 134.2 | 173 | 134.2 |
| Total Eq.Wt. (g) |  | 136.4 | 134.2 | 173 | 134.2 |
| Water adjustment (g) |  | 0.39 |  |  | 0 |
| Weight ratio (isocyanate/polyol) |  | 2.05:1 [267.4/(100 + 30 + 0.39) = 2.05] |  |  | 2:1 |
| Index |  | 200 |  |  | 250 |

EXAMPLE 3

Samples were prepared using the method described in Example 1 except for the substitution of monomethacrylatemonohydroxyl for glycerolmonomethacrylate.

The following table gives the formulation result with monomethacrylatemonohydroxyl type of additive 2-Hydroxylethyl Methacrylate at 50% by weight of original saturated polyol as compared to the traditional formulation.

TABLE 5

|  | Unsaturated foam formulation | | | Base foam Formulation | |
| --- | --- | --- | --- | --- | --- |
|  | Original polyol | 2-Hydroxyethyl Methacrylate | Iso-cyanate | Original polyol | Iso-cyanate |
| Weight (g) | 100 | 50 | 277.8 | 100 | 200 |
| Individual Eq.Wt (g) | 173 | 130 | 134.2 | 173 | 134.2 |
| Total Eq.Wt. (g) |  | 155.8 | 134.2 | 173 | 134.2 |
| Water adjustment (g) |  | 0.65 |  |  | 0 |
| Weight ratio (isocyanate/polyol) |  | 1.8:1 [277.8/(100 + 50 + 0.65) = 1.8] |  |  | 2:1 |
| Index |  | 200 |  |  | 250 |

The results of examples 1–3 above are summarized in table 6 below:

The preceding examples have used an additive to provide the desired unsaturated C=C double bond and hydroxyl group on the polyol. It is contemplated that the polyol may be formulated to directly contain these functional groups. Additionally, when using specially formulated polyol, the base-line measuring step described will not be necessary. Further, the unsaturated polyol may be formulated to function well without blending with saturated polyol.

While the best modes for carrying out the invention have been described in detail, those familiar with the art to which this invention relates will recognize various alternative designs and embodiments for practicing the invention as defined by the following claims.

What is claimed:

1. A method of manufacturing a fiber reinforced article comprising:
   providing a foam core made from an unsaturated polyol containing at least one unsaturated C=C group and a hydroxyl functional group and wherein said foam core contains at least one unsaturated C=C group;
   placing a fiber-reinforcing layer adjacent to said foam core;
   wetting said reinforcing layer and the surface of said foam core with an uncured thermoset resin selected from the group consisting of polyester resins and vinyl ester resins;
   reacting said resin and said at least one unsaturated C=C group of said foam core whereby said resin bonds with said foam core by means of free radical reaction; and
   curing said resin, whereby said resin forms a solid polymer encasing said fiber reinforcing layer and bonding said fiber-reinforcing layer to said foam core to form said article.

2. The method of claim 1, wherein said providing step comprises blending a saturated polyol with an unsaturated polyol additive containing at least one C=C double bond and a hydroxyl group to form said foam core.

3. The method of claim 2, wherein said blending step comprises mixing said saturated polyol and said unsaturated polyol additive with an isocyanate to react and form said foam core.

4. The method of claim 2, wherein said additive is a methacrylate.

5. The method of claim 4, wherein said additive consists essentially of glycerol 1,3 dimethacrylate.

6. The method of claim 4, wherein said additive consists essentially of 2-hydroxyethyl methacrylate.

7. The method of claim 2, wherein said additive consists essentially of 2-butene-1,4-diol.

8. The method of claim 2, wherein said additive consists essentially of glycerolmonomethacrylate.

9. The method of claim 1, wherein said resin consists essentially of vinyl ester.

10. The method of claim 1, wherein said polyol is polyether.

11. The method of claim 9, wherein said resin is liquid and is injected into a mold containing said foam core and said reinforcing layer.

12. The method of claim 11, wherein said resin has the following chemical formula:

TABLE 6

| Additive Type | Additive Level (%-polyol) | Peel/Shear Strength (lbs.) | Failure Mode | Surface Treatment |
| --- | --- | --- | --- | --- |
| n/a | 0 | 15 | Adhesive | None |
| n/a | 0 | 35 | Cohesive | Abrasion |
| Monohydroxyl dimethacrylate (Glycerol 1,3 Dimethacrylate) | 15 | 28 | Cohesive | None |
| Monohydroxyl dimethacrylate (Glycerol 1,3 Dimethacrylate) | 50 | 30 | Cohesive | None |
| Monomethacrylatediol (Glycerolmonomethacrylate) | 30 | 15 | Adhesive | None |
| Monohydroxyl monomethacrylate (2-Hydroxyethyl Methacrylate) | 50 | 29 | Cohesive | None |

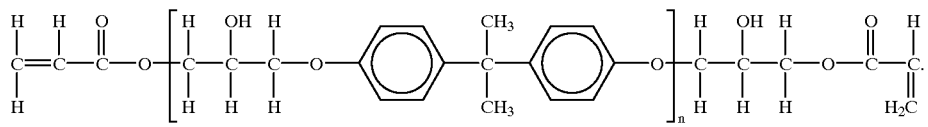

13. A method of manufacturing a fiber reinforced article comprising:

blending a saturated polyether polyol with a methacrylate additive containing at least one C=C double bond and a hydroxyl group;

mixing said saturated polyol and said additive with isocyanate to form a polyurethane foam core having at least one C=C double bond and a hydroxyl group;

placing a fiber-reinforcing layer adjacent said foam core;

wetting said reinforcing layer and the surface of said foam core with an uncured thermoset vinyl ester resin;

reacting said resin and polyol whereby said resin bonds with said at least one C=C double bond of said foam core by means of a free radical reaction; and curing said resin, whereby said resin forms a solid polymer encasing said fiber reinforcing layer and bonding said fiber-reinforcing layer to said foam core to form said article.

* * * * *